(12) United States Patent
Oblizajek et al.

(10) Patent No.: US 9,574,972 B2
(45) Date of Patent: Feb. 21, 2017

(54) METHODS AND SYSTEMS FOR EVALUATING VEHICLE STEERING SYSTEMS

(75) Inventors: Kenneth L. Oblizajek, Troy, MI (US); John D. Sopoci, Commerce Township, MI (US); William Keith Adams, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 888 days.

(21) Appl. No.: 12/985,043

(22) Filed: Jan. 5, 2011

(65) Prior Publication Data
US 2012/0173079 A1 Jul. 5, 2012

(51) Int. Cl.
*B62D 6/00* (2006.01)
*G01M 17/06* (2006.01)
*G01L 5/22* (2006.01)
*B62D 5/04* (2006.01)

(52) U.S. Cl.
CPC ............ *G01M 17/06* (2013.01); *B62D 5/0481* (2013.01); *G01L 5/221* (2013.01); *B60W 2710/20* (2013.01); *B60W 2710/205* (2013.01)

(58) Field of Classification Search
CPC .... G01M 17/06; G01L 5/221; B60W 2710/20; B60W 2710/205
USPC .... 701/41; 702/41, 108, 113, 114, 115, 121; 73/11.07, 11.08, 117.02
See application file for complete search history.

(56) References Cited

U.S. PATENT DOCUMENTS

| | | | |
|---|---|---|---|
| 4,372,844 A | | 2/1983 | Bresson et al. |
| 4,672,844 A | * | 6/1987 | Meyer ................... G01M 17/06 73/116.01 |
| 5,345,764 A | * | 9/1994 | Phillips ........................... 60/393 |
| 5,700,951 A | * | 12/1997 | Sagiyama ............. G01M 17/06 73/11.04 |
| 5,880,381 A | * | 3/1999 | Sathe .................. G01M 13/027 73/865.6 |
| 6,055,853 A | * | 5/2000 | Roberts et al. ............ 73/117.02 |
| 2005/0022587 A1 | * | 2/2005 | Tentrup ............... G01M 17/007 73/116.06 |
| 2005/0284245 A1 | * | 12/2005 | Chen .................... B62D 5/0457 74/388 PS |

(Continued)

FOREIGN PATENT DOCUMENTS

| | | |
|---|---|---|
| CN | 101017117 A | 8/2007 |
| CN | 101509807 A | 8/2009 |

(Continued)

OTHER PUBLICATIONS

Qatu, M.S., Llewellyn, D.R. & Spadafora, W.G. Experimental Mechanics (2001) 41: 151.*

(Continued)

*Primary Examiner* — Thomas G Black
*Assistant Examiner* — Peter D Nolan
(74) *Attorney, Agent, or Firm* — Lorenz & Kopf, LLP (57) ABSTRACT

Methods and systems are provided for evaluating a steering system of a vehicle, in which the steering system includes a steering column, steering rack, and pinion. The rack is manipulated as the steering system is mounted to a testing system. The steering column is also manipulated as the steering system is mounted to the testing system. Data is collected from the manipulating of the rack and the dithering of the steering column for use in evaluating the steering system.

19 Claims, 4 Drawing Sheets

(56) References Cited

U.S. PATENT DOCUMENTS

| | | |
|---|---|---|
| 2007/0175695 A1* | 8/2007 | Bishop et al. ................ 180/444 |
| 2009/0204343 A1* | 8/2009 | Lemont, Jr. ........... G01M 7/027 |
| | | 702/33 |
| 2010/0017064 A1* | 1/2010 | Kojima .......................... 701/42 |
| 2010/0031739 A1 | 2/2010 | Oblizajek et al. |
| 2011/0153160 A1* | 6/2011 | Hesseling et al. ............. 701/41 |
| 2012/0150389 A1* | 6/2012 | Oblizajek et al. ............. 701/42 |

FOREIGN PATENT DOCUMENTS

| | | |
|---|---|---|
| CN | 101696908 A | 4/2010 |
| CN | 101821149 A | 9/2010 |
| DE | 19622687 A1 | 12/1996 |
| DE | 102006016764 A1 | 10/2007 |
| KR | 20000056905 A | 9/2000 |
| KR | 20060133704 A | 12/2006 |

OTHER PUBLICATIONS

German Patent and Trade Mark Office, Office Action in German Patent Application No. 10 2011 089 950.2 mailed Aug. 18, 2015.
State Intellectual Property Office of the Peoples' Republic of China, Office Action for Chinese Patent Application No. 201210001780.2, mailed Sep. 17, 2014.
State Intellectual Property Office of the People'S Republic of China, Office Action for Chinese Patent Application No. 201210001780.2, mailed Dec. 12, 2013.

* cited by examiner

METHODS AND SYSTEMS FOR EVALUATING VEHICLE STEERING SYSTEMS

TECHNICAL FIELD

The present disclosure generally relates to vehicles, and more particularly relates to methods and systems for evaluating steering systems for vehicles.

BACKGROUND

Vehicle steering systems contain various components and/or subsystems, such as a steering wheel, a steering column, a rack, and a pinion. It is often difficult to evaluate the vehicle steering systems and/or the various components and/or subsystems thereof. For example, when the vehicle is operating, it may be difficult to separate characteristics of the vehicle steering system, its components, and/or subsystems from other factors, such as the operation of other vehicle systems, a driver's operating characteristics for the vehicle, environmental conditions, and the like.

Accordingly, it is desirable to provide an improved method for testing a vehicle steering system, for example before the vehicle steering system is integrated into a vehicle. It is also desirable to provide an improved program product and an improved system for such testing of a vehicle steering system. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method for evaluating a steering system of a vehicle using a testing system, the steering system comprising a steering column, steering rack, and pinion, is provided. The method comprises the steps of manipulating the rack on the testing system, manipulating the steering column on the testing system, and collecting data while the rack and the steering column are being manipulated on the testing system for evaluating the steering system.

In accordance with another exemplary embodiment, a program product for evaluating a steering system of a vehicle using a testing system, the steering system comprising a steering column, steering rack, and pinion, is provided. The program product comprises a program and a non-transitory computer readable medium. The program is configured to facilitate manipulating the rack on the testing system, manipulating the steering column on the testing system, and collecting data while the rack and the steering column are being manipulated for evaluating the steering system. The non-transitory computer readable medium bears the program and contains computer instructions stored therein for causing a computer processor to execute the program.

In accordance with a further exemplary embodiment, a system for evaluating a steering unit of a vehicle using a testing system, the steering unit comprising a steering column, steering rack, and pinion, is provided. The system comprises a first actuator, a second actuator, and a sensor unit. The first actuator is configured to manipulate the rack on the testing system. The second actuator is configured to manipulate the steering column on the testing system. The sensor unit is configured to obtain data while the rack and the steering column are being manipulated for use in evaluating the steering system.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
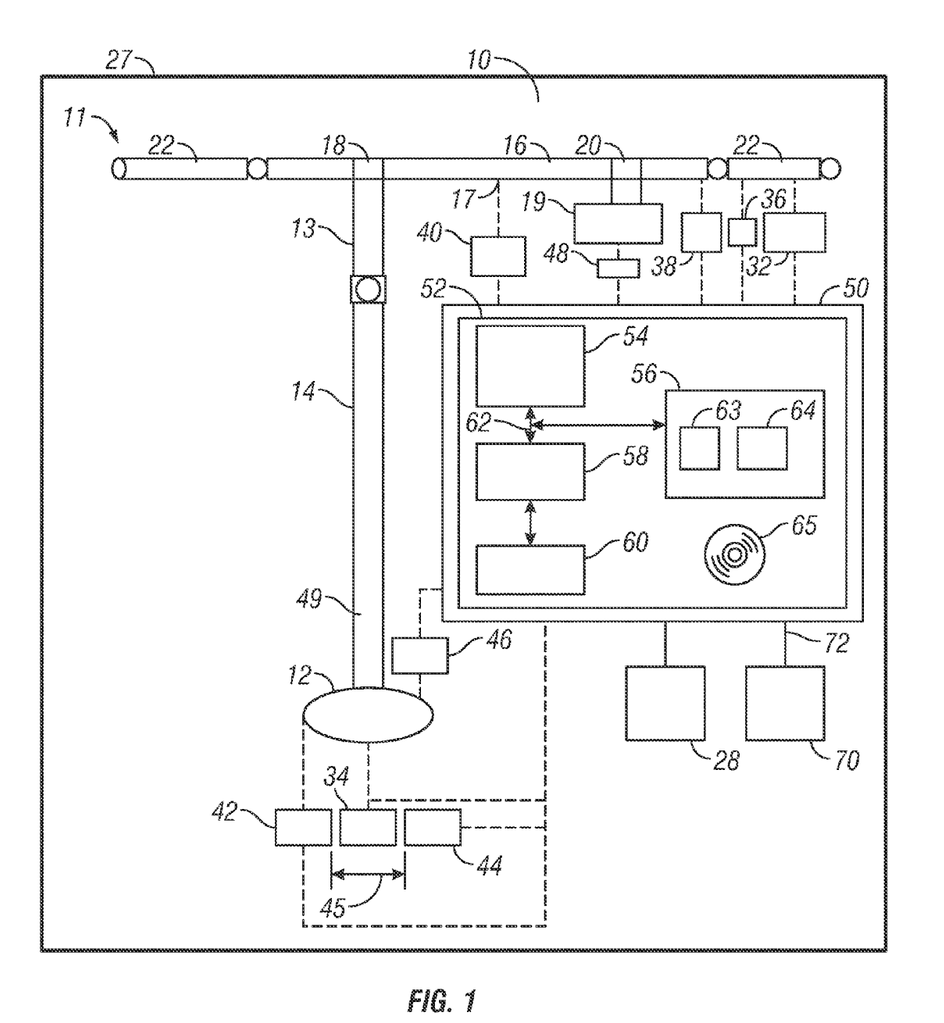
FIG. 1 is a schematic drawing of testing system for evaluating a steering system for a vehicle, depicted along with an exemplary vehicle steering system, in accordance with an exemplary embodiment.

FIG. 1 is a schematic drawing of a testing system 10 for a vehicle steering system 11, in accordance with an exemplary embodiment. The testing system 10 is configured to evaluate and analyze the vehicle steering system 11 and various components thereof, for example as described below. The testing system 10 preferably performs such evaluations and analysis using the steps of the process 90 depicted in FIG. 2 and described further below in connection therewith.

The vehicle steering system 11 includes a steering wheel mass 12, a steering column assembly 14, a rack 16 having a rack housing 17, a control pinion 18, an electric motor 19 (in embodiments in which the vehicle steering system 11 comprises an electronic power steering system), an assist pinion 20, optionally one or more tie rods 22, and an intermediate shaft 13. The steering column assembly 14 is coupled to the steering wheel mass 12, and is rotationally movable thereby. The steering column assembly 14 is configured to at least facilitate movement of wheels of the vehicle based at least in part on movement of the steering wheel mass 12. Specifically, operation of the steering wheel mass 12 causes rotational movement of the steering column assembly 14 and intermediate shaft 13, which in turn causes translational movement of the rack 16 and tie rods 22 via the control pinion 18 and the assist pinion 20, and thereby ultimately causing rotation of the wheels of the vehicle. The steering wheel mass 12 need not be an actual steering wheel, but may only be a representative mass with a predetermined or measureable Polar Moment of Inertia (PMI) attached to the upper end of the steering column assembly 14. The intermediate shaft 13 may be omitted unless it is required to test the system in an in-vehicle orientation.

As depicted in FIG. 1, the testing system 10 includes a base 27, a rack actuator 32, a steering input actuator 34, a rack force sensor 36, a rack accelerometer 38, a rack housing accelerometer 40, a first steering wheel accelerometer 42, a second steering wheel accelerometer 44, a steering angle sensor 46, and a motor speed sensor 48. The rack actuator 32, the steering input actuator 34, the rack force sensor 36, the rack accelerometer 38, the rack housing accelerometer 40, the first steering wheel accelerometer 42, the second steering wheel accelerometer 44, the steering angle sensor 46, and the motor speed sensor 48 are preferably each stored within the base 27 and/or a housing thereof. The base 27 preferably comprises a rigid test stand or bed plate. The vehicle steering system 11 is preferably mounted onto the base 27 and/or a housing thereof. The testing system 10 also preferably includes a power supply 28. For example, the power supply 28 preferably comprises a hydraulic power supply (HPS) if HPS gears are utilized. By way of further example, the power supply 28 preferably comprises an electric power supply (EPS) if EPS gears are utilized.

The rack actuator 32 is coupled between the controller 50 and the rack 16. The rack actuator 32, causes translational movement of the rack 16 based on instructions provided to the rack actuators 32 by the controller 50 (and, preferably, by a processor 54 thereof) for testing purposes in implementing one or more steps of the process 90 of FIG. 2 (described further below). The number and/or placement of the rack actuators 32 may vary in other embodiments.

The steering input actuator 34 is coupled between the controller 50 and the steering wheel mass 12. The steering input actuator 34 also preferably comprises a torsional spring. The steering input actuator 34, via the torsional spring thereof, causes rotational movement of the steering wheel mass 12 and the steering column assembly 14 based on instructions provided to the steering input actuator 34 by the controller 50 (and, preferably, by a processor 54 thereof) for testing purposes in implementing one or more steps of the process 90 of FIG. 2 (described further below).

The rack force sensor 36 is coupled between the rack 16 and the controller 50. The rack force sensor 36 measures a force, or load, applied by the rack actuator 32 to the rack 16 and provides values representative thereof to the controller 50 for processing.

The rack accelerometer 38 is coupled between the rack 16 and the controller 50. The rack accelerometer 38 measures a lateral acceleration of the rack 16 and provides values representative thereof to the controller 50 for processing.

The rack housing accelerometer 40 is coupled between the rack housing 17 and the controller 50. The rack housing accelerometer 40 measures a lateral acceleration of the rack housing 17 and provides values representative thereof to the controller 50 for processing.

The first steering wheel accelerometer 42 is coupled between the steering wheel mass 12 and the controller 50. The first steering wheel accelerometer 42 measures a tangential acceleration of the steering wheel mass 12 as measured from the first portion near the outer diameter of the steering wheel mass 12, and provides values representative thereof to the controller 50 for processing.

The second steering wheel accelerometer 44 is also coupled between the steering wheel mass 12 and the controller 50. The second steering wheel accelerometer 44 measures a tangential acceleration of the steering wheel mass 12 as measured from the second portion near the outer diameter of the steering wheel mass 12, and provides values representative thereof to the controller 50 for processing.

The positions of the first steering wheel accelerometer 42 and the second steering wheel accelerometer 44 are preferably 180 degrees apart. The distance between the first steering wheel accelerometer 42 and the second steering wheel accelerometer 44 is denoted as distance 45 in FIG. 1, and is also referenced herein as distance "D".

The steering angle sensor 46 is coupled between the controller 50 and either the steering wheel mass 12 or a column shaft 49 of the steering column assembly 14. The steering angle sensor 46 measures a steering angle of the steering wheel mass 12 and/or the steering column assembly 14 and provides values representative thereof to the controller 50 for processing.

The motor speed sensor 48 is coupled between the controller 50 and the electric motor 19. The motor speed sensor 48 measures a rotational speed of the electric motor 19, for example in an electronic power steering system, and provides values representative thereof to the controller 50 for processing.

The controller 50 is coupled to and controls the rack actuator 32 and the steering input actuator 34 for testing of the vehicle steering system 11 and components and/or subsystems thereof. The controller 50 is also coupled to the rack force sensor 36, the rack accelerometer 38, the rack housing accelerometer 40, the first steering wheel accelerometer 42, the second steering wheel accelerometer 44, the steering angle sensor 46, and the motor speed sensor 48, and receives data therefrom. The controller 50 is also preferably in operative communication with an engine control unit 70 of the vehicle corresponding to the vehicle steering system 11 via a communications bus 72 (for example, a CAN bus), in order to receive additional data (such as vehicle parameters that may include, among others, vehicle speed, engine revolutions per minute (RPM), and the like). The controller 50 processes the various types of data, and provides evaluations and analysis regarding testing of the vehicle steering system 11 and/or components thereof. The controller 50 preferably performs these functions while performing various steps of the process 90 depicted in FIG. 2 and described further below in connection therewith.

As depicted in FIG. 1, the controller 50 comprises a computer system 52. The computer system 52 includes a processor 54, a memory 56, an interface 58, a storage device 60, and a bus 62. The processor 54 performs the computation and control functions of the computer system 52 and the controller 50, and may comprise any type of processor or multiple processors, single integrated circuits such as a microprocessor, or any suitable number of integrated circuit devices and/or circuit boards working in cooperation to accomplish the functions of a processing unit. During operation, the processor 54 executes one or more programs 63 contained within the memory 56 and, as such, controls the general operation of the controller 50 and the computer system 52, preferably in executing the steps of the processes described herein, such as the process 90 depicted in FIG. 2 and described further below in connection therewith.

The memory 56 can be any type of suitable memory. This would include the various types of dynamic random access memory (DRAM) such as SDRAM, the various types of static RAM (SRAM), and the various types of non-volatile memory (PROM, EPROM, and flash). The bus 62 serves to transmit programs, data, status and other information or signals between the various components of the computer system 52. In a preferred embodiment, the memory 56 stores the above-referenced program 63 along with one or more stored values 64 that are used in analyzing and evaluating the vehicle steering system 11 and the components and subsystems thereof in accordance with steps of the process 90 depicted in FIG. 2 and described further below in connection therewith. In certain examples, the memory 56 is located on and/or co-located on the same computer chip as the processor 54.

The interface 58 allows communication to the computer system 52, for example from a system driver and/or another computer system, and can be implemented using any suitable method and apparatus. It can include one or more network interfaces to communicate with other systems or components. The interface 58 may also include one or more network interfaces to communicate with technicians, and/or one or more storage interfaces to connect to storage apparatuses, such as the storage device 60.

The storage device 60 can be any suitable type of storage apparatus, including direct access storage devices such as hard disk drives, flash systems, floppy disk drives and optical disk drives. In one exemplary embodiment, the storage device 60 comprises a program product from which memory 56 can receive a program 63 that executes one or more embodiments of one or more processes of the present disclosure, such as the process 90 of FIG. 2 or portions thereof. In another exemplary embodiment, the program product may be directly stored in and/or otherwise accessed by the memory 56 and/or a disk (e.g. disk 65), such as that referenced below.

The bus 62 can be any suitable physical or logical means of connecting computer systems and components. This includes, but is not limited to, direct hard-wired connections, fiber optics, infrared and wireless bus technologies. During operation, the program 63 is stored in the memory 56 and executed by the processor 54.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 54) to perform and execute the program. Such a program product may take a variety of forms, and that the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 52 may also otherwise differ from the embodiment depicted in FIG. 1, for example in that the computer system 52 may be coupled to or may otherwise utilize one or more remote computer systems and/or other control systems.

Figure 2:
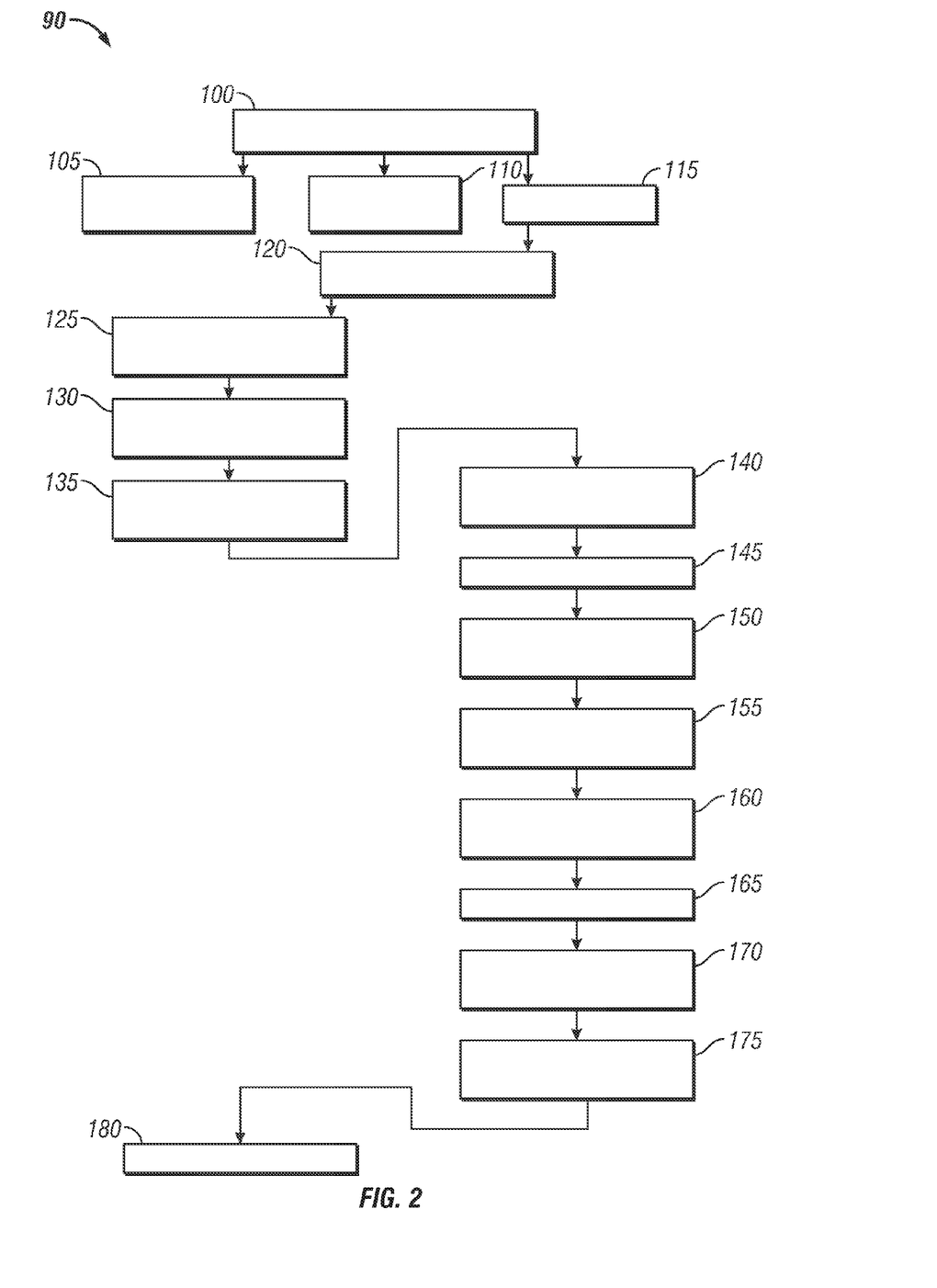
FIG. 2 is a flowchart of a process for evaluating a steering system for a vehicle, and that can be implemented in connection with the testing system and the vehicle steering system of FIG. 1, in accordance with an exemplary embodiment.

FIG. 2 is a flowchart of a process 90 for evaluating and analyzing a vehicle steering system and components and subsystems thereof. The process 90 can preferably be implemented in connection with the testing system 10, the vehicle steering system 11, and the components and subsystems thereof.

As depicted in FIG. 2, the process 90 begins with the step of mounting a vehicle steering system to a testing system (step 100). Preferably the vehicle steering system corresponds to the vehicle steering system 11 of FIG. 1, and the testing system corresponds to the testing system 10 of FIG. 1. The vehicle steering system 11 is preferably mounted on the base 27 of the testing system 10 of FIG. 1, and the base 27 preferably comprises a rigid test stand or bed plate. Preferably, the steering wheel mass 12, the steering column assembly 14, and the rack 16 of FIG. 1 are each attached to the base 27 of FIG. 1 via solid mounts or with a set production or experimental bushings.

The rack is manipulated on the test system (step 105). During step 105, one or more tie rods 22, or the rack 16, of FIG. 1 are preferably excited by the rack actuator 32 of FIG. 1 via instructions provided by the processor 54 of FIG. 1 when the vehicle steering system 11 of FIG. 1 is mounted on the base 27 of the testing system 10 of FIG. 1. In a preferred embodiment, a sinusoidal force excitation is utilized at various amplitudes to excite the tie rod. Preferably, a frequency dwell input is utilized, in which the frequency of the excitation is held constant for a predetermined period of time (most preferably, approximately sixteen seconds) before progressing to the next frequency. Most preferably, this step begins at a frequency of five Hz and increments by an amount of one Hz every period until a target frequency of thirty Hz is reached. In certain other embodiments, a steadily increasing sweep or chirp of the frequency from the start to the end frequency may be employed. In yet other embodiments, a random or constant frequency dither signal may be superimposed on top of the excitation, for example to help break up any static friction that may exist in the steering system, among other possible variations. However, if the dither has a constant frequency, it should be at a frequency that is sufficiently out of the band of interest (i.e., outside of the 5-30 Hz, in a preferred embodiment) so as not to affect the test results.

In addition, the steering column is manipulated on the test system (step 110). In one embodiment, dithering is applied to the steering column assembly 14 of FIG. 1 via rotational movement of the steering wheel mass 12 of FIG. 1 by the steering input actuator 34 of FIG. 1 via instructions provided by the processor 54 of FIG. 1 when the vehicle steering system 11 of FIG. 1 is mounted on the base 27 of the testing system 10 of FIG. 1. Alternatively, dithering may be applied to the column shaft 49 of the steering column assembly 14 of FIG. 1 by the steering input actuator 34 of FIG. 1 via instructions provided by the processor 54 of FIG. 1 when the vehicle steering system 11 of FIG. 1 is mounted on the base 27 of the testing system 10 of FIG. 1. In a preferred embodiment, a triangular angular displacement signal is applied. The triangular angular displacement signal preferably has an amplitude of +/−10 degrees, and a period of approximately 16 seconds. The triangular angular displacement signal is preferably applied through a torsional spring of the steering input actuator 34 of FIG. 1 with a low enough torsional constant so as not to interfere with the natural response of the vehicle steering system 11 of FIG. 1. In certain embodiments, the dithering of step 110 may instead be force based. In one embodiment, if the dithering is applied to the vehicle steering system 11 of FIG. 1 via the rack 16 and/or the tie rods 22 of FIG. 1 as described above in connection with step 105, then it may not be necessary to apply the dithering at the column shaft 49 or the steering wheel mass 12 of FIG. 1 in step 110.

Data may be acquired with or without power (hydraulic or electric) being supplied to the gear. Data is acquired during the application of the excitation and dithering of steps 105 and 110 (step 115). The data preferably includes at least five channels of data; namely: (i) the rack force, or the load applied to the rack (denoted as Fr, and preferably measured in Newtons by the rack force sensor 36 of FIG. 1); (ii) the rack acceleration, or the lateral acceleration of the rack (denoted as Ar, and preferably measured by the rack accelerometer 38 of FIG. 1 in m/s^2); (iii) the housing acceleration, or the acceleration of the rack housing (denoted as Ah, and preferably measured by the rack housing accelerometer 40 of FIG. 1 in m/s^2); (iv) a first steering wheel acceleration, or the tangential acceleration of the steering wheel mass as measured near its outer diameter at a first angle (denoted as Asw1, and preferably measured by the first steering wheel accelerometer 42 of FIG. 1 in m/s^2); and (v) a second steering wheel acceleration, or the tangential acceleration of the steering wheel mass as measured near its outer diameter at a second angle that is approximately 180 degrees apart from the first angle (denoted as Asw2, and preferably measured by the second steering wheel accelerometer 44 of FIG. 1 in m/s^2).

In addition, in certain embodiments, during step 115, a sixth channel may also be measured, namely a motor speed (denoted as Vm, and preferably measured by the motor speed sensor 48 of FIG. 1 in deg/s). In a preferred embodiment, this sixth channel need only be measured if one wishes to investigate the activity of an electric power steering (EPS) motor.

All of the data in step 115 are preferably captured at a rate of at least sixty samples per second, per channel. Most preferably, the data in step 115 are captured at faster rates, in a range of approximately 200 samples per second per channel to approximately 2048 samples per second per channel.

The data from step 115 is then analyzed (combined step 120). Specifically, during the combined step 120, the data is preferably processed by the processor 54 of FIG. 1, as set forth below in connection with steps 125-180. Alternatively, some or all of the data analysis of these steps may be conducted by one or more separate, offline, and/or off-site processors. In addition, in certain embodiments, step 120 is a combination of steps 125-180, and/or may be performed separately and after step 115.

As part of the data analysis, the direct current (DC) component is preferably removed from each of the different channels from the data (step 125). This is performed in order to account for any offset errors in the sensors or the testing system itself.

In addition, a steering wheel angular acceleration is calculated (step 130). The steering wheel angular acceleration is a primary output metric of the test procedure. In a preferred embodiment, the steering wheel angular acceleration is calculated using the following equation:

$$AAsw = \frac{Asw1 + Asw2}{D},$$

in which Asw1 is the first steering wheel acceleration, Asw2 is the second steering wheel acceleration, and D is the distance 45 of FIG. 1 between the first and second steering wheel accelerometers 42, 44 of FIG. 1. This equation assumes that the orientation of both accelerometers is positive in the clockwise direction.

The units of the steering wheel angular Acceleration are preferably in rad/s^2. Alternatively the steering wheel angular acceleration may be measured with an angular acceleration transducer or via one or more other methods known to those skilled in the art.

The data is segmented into constant frequency data blocks (step 135). In a preferred embodiment, a frequency dwell excitation is utilized, and the dwell periods coincide with the periods of the torsional dithering of the steering wheel mass.

Accordingly, it is preferred to use the steering wheel angle channel as a reference to help segment the entire data set into constant frequency blocks and analyze each of them separately. Additionally, because the dithering spends equal amounts of time (for example, eight seconds per period) in both the clockwise (CW) and counterclockwise (CCW) directions, the data can be further segments into constant frequency and direction blocks. Alternatively, the dwell periods may be determined by acquisition timing or one or more other methods known to those skilled in the art. If a sweep or chirp procedure is used instead of the dwell procedure, then the entire data set is preferably analyzed at one time, and data segmentation is not required. Also in a preferred embodiment, each data block will provide one data point for each quantity of interest.

A fast Fourier transform (FFT) is performed on the rack force, in order to attain the drive frequency (step 140). In a preferred embodiment, the FFT is performed after a frequency of the data block is first determined. The FFT is performed on the rack force channel in part because this is often considered to be the cleanest and/or most accurate signal acquired. The magnitudes of the FFT are examined over the frequency range used in the acquisition (e.g., 5-30 Hz), and a maximum value thereof is preferably determined. This preferably corresponds to the drive frequency of the data block. Alternatively, in certain embodiments, an FFT could be performed on a voltage reference channel, such as a command signal from the processor to the tie rod force actuator. Also, the frequency of the data block could be predetermined based on the acquisition procedure and passed on to the analysis routines accordingly in certain embodiments.

In addition, a band pass filter is applied (step 145). The band pass filter is preferably applied to each of the channels. In a preferred embodiment, the corner frequencies of the band pass filter are set to 0.5 Hz below and 0.5 Hz above the drive frequency ascertained in step 140. All channels are preferably identically filtered to avoid relative distortions between filtered and unfiltered channels.

Additional manipulations are also preferably performed in order to eliminate filter startup and ending transients (step 150). In a preferred embodiment, the filter transients from the analysis are eliminated by removing the first and last 0.5 seconds of the filtered signal. This is preferably performed in an identical manner across each of the channels.

A maximum angular acceleration time point is then determined (step 155). In a preferred embodiment, step 155 comprises a determination as to the instant in time when the static friction in the vehicle steering system has been substantially broken and/or otherwise dissipated. The determination of step 155 is preferably accomplished by determining the peak activity of the primary output of the system, namely, the steering wheel angular acceleration, in this embodiment. In order to accomplish this determination, an examination is preferably conducted as to a filtered steering wheel angular acceleration time trace, and the time point of the maximum value is identified accordingly.

In addition, a second window is defined around the maximum angular acceleration time point (step 160). In a preferred embodiment, a full second of data is used to continue the analysis. A window of the time data is preferably defined from 0.5 seconds before the maximum time point to 0.5 seconds after the maximum time point. If the maximum time point is less than 0.5 seconds from the start or end of the time trace, then the first or last second, respectively, is preferably used in the analysis. The same time window is preferably defined in each channel.

An FFT is then performed on all channels (step 165). In a preferred embodiment, the FFT is performed on each of the channels using only the data defined for the one second blocks. A complex quantity corresponding to the drive frequency for the data block is preferably determined using the FFT.

Complex quantity ratios are then preferably calculated as follows (step 170):

$$Ratio1 = AAsw/Fr;$$

$$Ratio2 = AAsw/(Ar-Ah);$$

$$Ratio3 = Fr/(Ar-Ah);$$

$$Ratio4 = Fr/Ar; \text{ and}$$

$$Ratio5 = Vm/(Ar-Ah)$$

The complex quantity ratios are then preferably converted to the desired units as follows (step 175):

$$\text{Gear Sensitivity} = Ratio1 \text{ (rad/s}^2\text{/N)}$$

$$\text{Gear Ratio} = Ratio2 * 180/1000 * pi \text{ (deg/mm)}$$

$$\text{Gear Stiffness} = Ratio3 * -(2*pi*Freq)^2/1000 \text{ (N/mm)}$$

$$\text{Gear Impedance} = Ratio4 * -(2*pi*Freq)^2/1000 \text{ (N/mm)}$$

$$\text{Motor Ratio} = Ratio5 * -(2*pi*Freq)/(1000*i) \text{ (deg/mm)}$$

Figure 3:
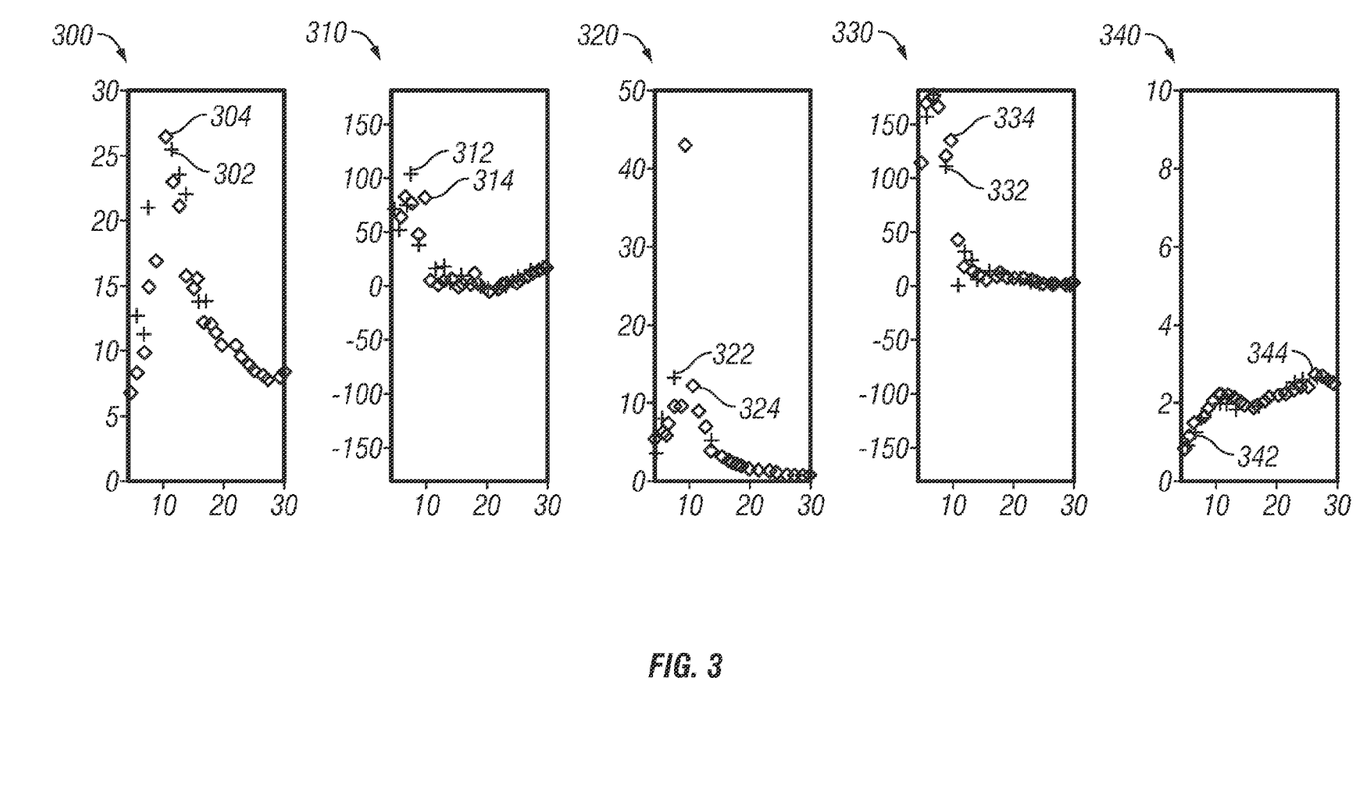
FIG. 3 includes graphical representations of various complex quantity ratios generated via the steps of the process of FIG. 2, including gear stiffness, gear ratio, gear sensitivity, gear impedance, and motor ratio, in accordance with an exemplary embodiment.

With reference to FIG. 3, exemplary graphical representations of the above-referenced complex quantity ratios of step 175 of the process 90 of FIG. 2 are provided, in accordance with an exemplary embodiment. As shown in FIG. 3, a first graphical representation 300 includes a first gear stiffness magnitude plot 302 with counterclockwise rotation of the steering wheel and a second gear stiffness magnitude plot 304 with clockwise rotation of the steering wheel. In the first graphical representation 300, the x-axis represents frequency (in Hz), and the y-axis represents magnitude in kN/mm. A second graphical representation 310 includes a first gear stiffness phase plot 312 with counterclockwise rotation of the steering wheel and a second gear stiffness phase plot 314 with clockwise rotation of the steering wheel. In the second graphical representation 310, the x-axis represents frequency (in Hz), and the y-axis represents the phase (in degrees).

Also as depicted in FIG. 3, a third graphical representation 320 includes a first gear ratio magnitude plot 322 with counterclockwise rotation of the steering wheel and a second gear ratio magnitude plot 324 with clockwise rotation of the steering wheel. In the third graphical representation 320, the x-axis represents frequency (in Hz), and the y-axis represents magnitude in deg/mm. A fourth graphical representation 330 includes a first gear ratio phase plot 332 with counterclockwise rotation of the steering wheel and a second gear ratio phase plot 334 with clockwise rotation of the steering wheel. In the fourth graphical representation 330, the x-axis represents frequency (in Hz), and the y-axis represents the phase (in degrees).

In addition, a fifth graphical representation 340 includes a first gear sensitivity magnitude plot 342 with counterclockwise rotation of the steering wheel and a second gear sensitivity magnitude plot 344 with clockwise rotation of the steering wheel. In the fifth graphical representation 340, the x-axis represents frequency (in Hz), and the y-axis represents magnitude in deg/s^2/N. A sixth graphical representation 350 includes a first gear sensitivity phase plot 352 with counterclockwise rotation of the steering wheel and a second gear sensitivity phase plot 354 with clockwise rotation of the steering wheel. In the sixth graphical representation 350, the x-axis represents frequency (in Hz), and the y-axis represents the phase (in degrees).

Also as shown in FIG. 3, a seventh graphical representation 360 includes a first gear impedance magnitude plot 362 with counterclockwise rotation of the steering wheel and a second gear impedance magnitude plot 364 with clockwise rotation of the steering wheel. In the seventh graphical representation 360, the x-axis represents frequency (in Hz), and the y-axis represents magnitude in kN/mm. An eighth graphical representation 370 includes a first gear impedance phase plot 372 with counterclockwise rotation of the steering wheel and a second gear impedance phase plot 374 with clockwise rotation of the steering wheel. In the eighth graphical representation 370, the x-axis represents frequency (in Hz), and the y-axis represents the phase (in degrees).

In addition, as depicted in FIG. 3, a ninth graphical representation 380 includes a first motor ratio magnitude plot 382 with counterclockwise rotation of the steering wheel and a second motor ratio magnitude plot 384 with clockwise rotation of the steering wheel. In the ninth graphical representation 380, the x-axis represents frequency (in Hz), and the y-axis represents magnitude in deg/mm. A tenth graphical representation 390 includes a first motor ratio phase plot 392 with counterclockwise rotation of the steering wheel and a second motor ratio phase plot 394 with clockwise rotation of the steering wheel. In the tenth graphical representation 390, the x-axis represents frequency (in Hz), and the y-axis represents the phase (in degrees).

Returning now to FIG. 2, the vehicle steering system, and/or various components and/or subsystems thereof, are then analyzed and evaluated (step 180). Specifically, determinations are preferably made as to the health of the vehicle steering system and various components and/or subsystems thereof using the complex quantity ratios of step 175. Specifically, in one preferred embodiment, the vehicle steering system (and/or the components and/or subsystems thereof) are deemed to be acceptable if each of the following conditions are satisfied, namely: (i) the gear sensitivity is less than a first predetermined threshold; (ii) the gear ratio is less than a second predetermined threshold; (iii) the gear stiffness is greater than a third predetermined threshold; and (iv) the gear impedance is greater than a fourth predetermined threshold. Conversely, if one or more of these conditions are not satisfied, further investigation and/or remedial action may be pursued with respect to the vehicle system and/or one or more components and/or subsystems thereof.

It will be appreciated that the disclosed methods and systems may vary from those depicted in the Figures and described herein. For example, as mentioned above, the controller 50, the computer system 52, and/or portions and/or components thereof of FIG. 1 may be disposed in whole or in part in any one or more of a number of different vehicle units, devices, and/or systems. In addition, it will be appreciated that certain steps of the process 90 may vary from those depicted in FIG. 2 and/or described above in connection therewith. It will similarly be appreciated that certain steps of the process 90 may occur simultaneously or in a different order than that depicted in FIG. 2 and/or described above in connection therewith. It will also be appreciated that the graphical representations 300, 310, 320, 330, 340, 350, 360, 370, 380, and 390 may differ from those depicted in FIG. 3 and/or described above in connection therewith. It will similarly be appreciated that the disclosed methods and systems may be implemented and/or utilized in connection with any number of different types of automobiles, sedans, sport utility vehicles, trucks, and/or any of a number of other different types of vehicles, and in controlling any one or more of a number of different types of vehicle steering systems.

Accordingly, methods, program products, and systems are provided for evaluating and analyzing vehicle steering systems and components and subsystems thereof. The disclosed methods, program products allow for such evaluating and testing to be conducted in an improved manner prior to the vehicle steering system being implemented into the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for evaluating a steering system of a vehicle using a testing system, the steering system comprising a steering column, steering wheel mass, steering rack, and pinion, the method comprising the steps of:
   manipulating the rack on the testing system;
   manipulating the steering column on the testing system;
   collecting data while the rack and the steering column are being manipulated for evaluating the steering system, wherein the step of collecting data comprises the step of measuring an acceleration of steering when the steering column is being manipulated; and
   calculating a value pertaining to the steering system using the data, the value selected from the group consisting of a gear sensitivity, a gear stiffness, a gear impedance, and a motor ratio of the steering system.

2. The method of claim 1, wherein:
   the steering system includes a steering wheel mass;
   the testing system includes an actuator; and
   the step of manipulating the steering column comprises the step of dithering the steering wheel mass on the testing system.

3. The method of claim 1, wherein the step of collecting data comprises the step of:
   measuring a force applied to the rack when the rack is being manipulated.

4. The method of claim 3, wherein:
   the step of collecting data further comprises the step of measuring an acceleration of the rack when the rack is being manipulated.

5. The method of claim 1, wherein the step of collecting data further comprises the step of measuring a steering angle when the steering column is being manipulated.

6. The method of claim 1, wherein the step of calculating the value comprises the step of:
   calculating a gear sensitivity of the steering system using the data.

7. The method of claim 1, wherein the step of calculating the value comprises the step of:
   calculating a gear stiffness of the steering system using the data.

8. The method of claim 1, wherein the step of calculating the value comprises the step of:
   calculating a gear impedance of the steering system using the data.

9. The method of claim 1, further comprising the step of:
   calculating a gear ratio of the steering system using the data.

10. The method of claim 1, wherein the step of calculating the value comprises the step of:
    calculating a motor ratio of the steering system using the data.

11. A method for evaluating a steering system of a vehicle using a testing system, the steering system comprising a steering column, steering rack, and pinion, the method comprising:
    manipulating the rack on the testing system;
    manipulating the steering column on the testing system;
    collecting data when the rack and the steering column are being manipulated for evaluating the steering system;
    determining a maximum angular acceleration time for the data; and
    calculating a value pertaining to the steering system using a portion of the data corresponding to a window corresponding to the maximum angular acceleration time.

12. The method of claim 11, further comprising:
    measuring a force applied to the rack when the rack is being manipulated; and
    measuring an acceleration of the rack when the rack is being manipulated.

13. The method of claim 11, wherein the steering system includes a steering wheel mass, and the method further comprises:
    measuring an acceleration of the steering wheel mass when the steering column is being manipulated; and
    measuring a steering angle when the steering column is being manipulated.

14. The method of claim 11, wherein the step of calculating a value comprises:
    calculating a value pertaining to the steering system using a portion of the data corresponding to a window corresponding to the maximum angular acceleration time, the value selected from the group consisting of: a gear stiffness of the steering system, a gear impedance of the steering system using the data, a gear sensitivity of the steering system using the data, and a motor ratio of the steering system.

15. A system for evaluating a steering unit for a vehicle, the steering unit comprising a steering column, steering wheel mass, steering rack, and pinion, the system comprising:
    a first actuator configured to manipulate the rack on the system;
    a second actuator configured to manipulate the steering column on the system;
    a sensor unit configured to obtain data when the rack and the steering column are being manipulated for use in evaluating the steering unit, wherein the data comprises a measured acceleration of steering when the steering column is being manipulated; and
    a processor coupled to the sensor unit and configured to calculate one or more of the following, using the data: a gear stiffness, a gear impedance, a gear sensitivity, and a motor ratio of the steering unit.

16. The system of claim 15, wherein the sensor unit comprises:
- a first sensor configured to measure a force applied to the rack when the rack is being manipulated; and
- a second sensor configured to measure an acceleration of the rack when the rack is being manipulated.

17. The system of claim 15, wherein the steering unit includes a steering wheel mass, and the second actuator is configured to manipulate the steering column by dithering the steering wheel mass on the testing system.

18. The system of claim 15, wherein the steering unit includes a steering wheel mass, and the sensor unit comprises:
- a first sensor configured to measure an acceleration of the steering wheel mass when the steering column is being manipulated; and
- a second sensor configured to measure a steering angle when the steering column is being manipulated.

19. The system of claim 15, wherein the processor is configured to calculate, using the data: a motor ratio of the steering unit.

* * * * *